(12) United States Patent
Champion et al.

(10) Patent No.: US 7,014,929 B2
(45) Date of Patent: Mar. 21, 2006

(54) FUEL CELL

(75) Inventors: David Champion, Lebanon, OR (US); Gregory S Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 419 days.

(21) Appl. No.: 10/350,435

(22) Filed: Jan. 23, 2003

(65) Prior Publication Data

US 2004/0146774 A1 Jul. 29, 2004

(51) Int. Cl.
*H01M 8/00* (2006.01)
*H01M 8/02* (2006.01)
*H01M 4/90* (2006.01)

(52) U.S. Cl. .............................. 429/13; 429/34; 429/39; 429/40

(58) Field of Classification Search ................... 429/13, 429/34, 38, 39, 40, 44, 45
See application file for complete search history.

(56) References Cited

U.S. PATENT DOCUMENTS

| | | | |
|---|---|---|---|
| 4,248,941 A | 2/1981 | Louis et al. | |
| 5,100,742 A | 3/1992 | Wang et al. | |
| 5,874,183 A | 2/1999 | Uematsu | |
| 6,004,696 A * | 12/1999 | Barnett et al. ............ | 429/40 X |
| 6,124,053 A | 9/2000 | Bernard et al. | |
| 6,127,056 A | 10/2000 | Wheeler et al. | |
| 6,420,064 B1 * | 7/2002 | Ghosh et al. .................. | 429/40 |
| 2003/0049513 A1 * | 3/2003 | Ito et al. ........................ | 429/34 |
| 2003/0205641 A1 * | 11/2003 | McElroy et al. .......... | 244/53 R |
| 2004/0121217 A1 * | 6/2004 | Herman et al. ............... | 429/38 |

FOREIGN PATENT DOCUMENTS

| | | |
|---|---|---|
| EP | 126 1060 | 11/2002 |
| JP | 2000 243412 | 9/2000 |
| JP | 2003 282091 | 10/2003 |
| WO | WO 01/73881 | * 10/2001 |

OTHER PUBLICATIONS

Priestnall M A et al: "Compact mixed-reactant fuel cells" Journal of Power Sources, Elsevier Sequoia S.A. Lausanne, CH, vol. 106, No. 1-2, Apr. 1, 2002, XP004348665.

* cited by examiner

*Primary Examiner*—Stephen J. Kalafut

(57) ABSTRACT

A fuel cell in accordance with a present invention serially depletes reactants.

31 Claims, 3 Drawing Sheets

FUEL CELL

BACKGROUND OF THE INVENTIONS

1. Field of the Inventions

The present inventions are related to fuel cells.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, lightweight and produce virtually no environmental emissions. Nevertheless, the present inventors have determined that conventional fuel cells are susceptible to improvement. For example, the present inventors have determined that it would be desirable to improve the performance of fuel cells in which the reactants are combined prior to the electricity producing reaction. Such fuel cells are sometimes referred to as "single chamber fuel cells."

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell system are described below with reference to solid oxide fuel cells ("SOFCs"), other types of fuel cells, such as proton exchange membrane ("PEM") fuel cells, are equally applicable to the present inventions.

Figure 1:
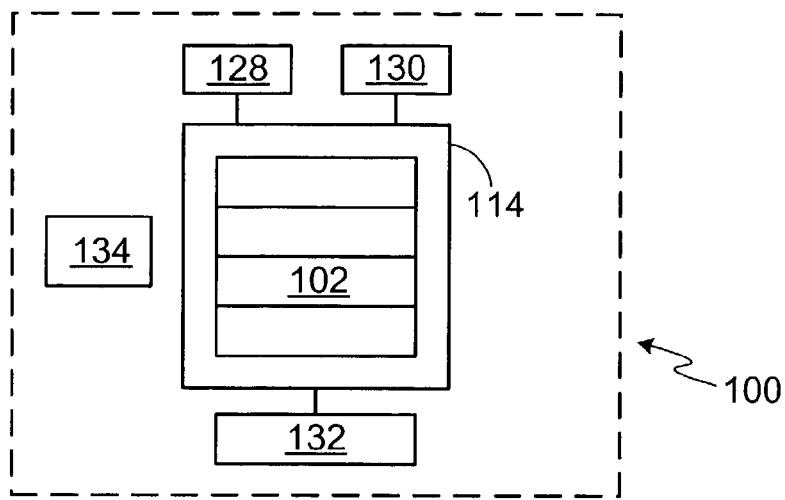
FIG. 1 is a diagrammatic view of a fuel cell system in accordance with a preferred embodiment of a present invention.
Figure 2:
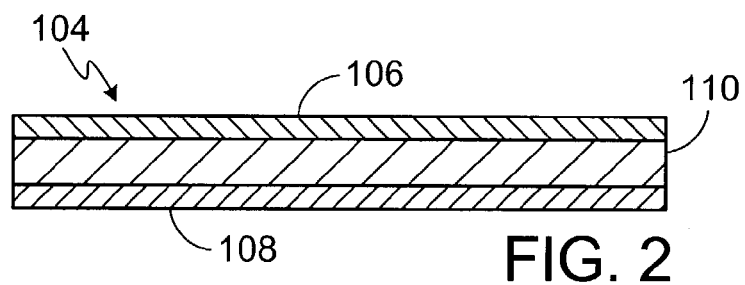
FIG. 2 is a section view of a fuel cell in accordance with a preferred embodiment of a present invention.
Figure 3:
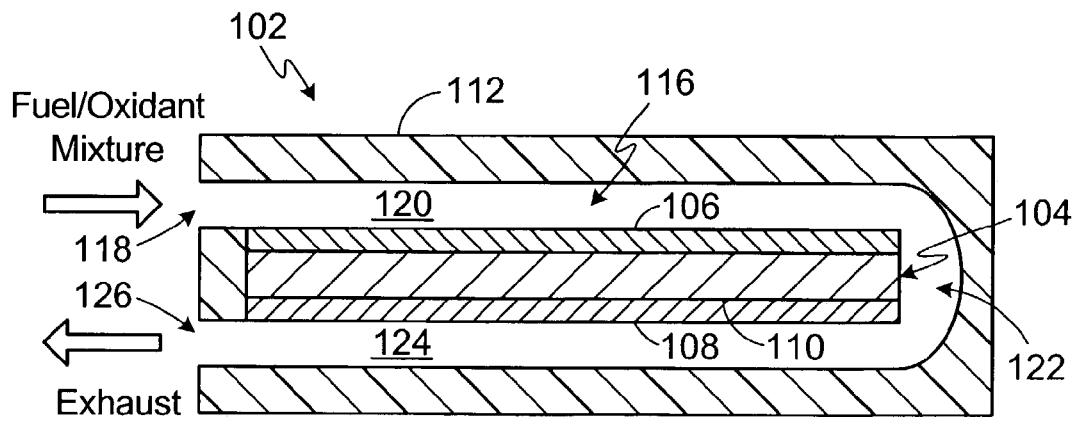
FIG. 3 is a section view of a fuel cell assembly in accordance with a preferred embodiment of a present invention.

As illustrated for example in FIGS. 1–3, a fuel cell system 100 in accordance with one embodiment of a present invention includes one or more solid oxide fuel cell assemblies 102. Each fuel cell assembly 102 includes a fuel cell 104, with an anode 106 and a cathode 108 separated by an electrolyte 110, and a housing 112. One or more fuel cell assemblies 102 are arranged in an assembly package 114 which includes the appropriate manifolds (not shown). Assembly packages which include multiple fuel cell assemblies 102 are also referred to as "stacks." The housings 112 may be an integral portion of the package 114 itself or, alternatively, the housings may be separate structural elements that are incorporated into the package during assembly.

The exemplary fuel cell assemblies 102 also include a reactant channel 116, which directs a fuel/oxidant mixture over the anode 106 and cathode 108, and has a U-like shape. Referring more specifically to FIG. 3, the fuel/oxidant mixture enters each of the fuel cell assemblies 102 by way of a reactant channel inlet 118, and then passes through an anode region 120, an intermediate region 122, and a cathode region 124. The exhaust (e.g. byproducts and any unused reactants) exits the fuel cell assemblies 102 by way of a reactant channel outlet 126. The inlets and outlets 118 and 126 of the respective fuel cell assemblies 102 are connected to the manifolds in the package 114. In the exemplary implementations illustrated and described herein, the housings 112 are closed but for the reactant channel inlets and outlets 118 and 126. Thus, although the present inventions are not limited to such an arrangement, the sole sources of reactants in the exemplary implementations are the reactant channel inlets 118.

Fuel, such as $H_2$ or hydrocarbon fuels such as $CH_4$, $C_2H_6$, $C_3H_8$, is supplied by a fuel supply 128, and oxidant, such as $O_2$ or ambient air, is supplied by an oxidant supply 130 in the exemplary system 100 illustrated in FIG. 1. In those instances where ambient air is used, the oxidant supply may simply be a vent or a vent and fan arrangement. The fuel and oxidant are combined by the manifold arrangement in the package 114 and the fuel/oxidant mixture directed through the inlets 118 of the reactant channels 116. The ratio of fuel to oxidant in the mixture will depend on the type of fuel used. Fuel/oxidant mixtures may also be stored together in a single supply.

The oxidant within the reactant channel 116 is electrochemically ionized at the cathodes 108, thereby producing ions that diffuse through the conducting electrolytes 110 and react with the fuel at the anodes 106 to produce byproducts ($CO_2$ and water vapor in the exemplary embodiment). The byproducts and any unused reactants exit the reactant channels 116 through the outlets 126 and are vented out of the package 114 by way of the byproduct outlet 132. A controller 134 may be provided to monitor and control the operations of the exemplary fuel cell system 100. Alternatively, the operation of the fuel cell system may be controlled by the host (i.e. power consuming) device.

With respect to current collection, current collectors (not shown) preferably extend along the anodes 106 and cathodes 108 to contact pads (also not shown). Suitable current collector materials include stainless steel, silver (cathode only), gold and platinum. Alternatively, materials such as lanthanum strontium chromite with good electrical conductive properties may be added to the materials used to form the anodes 106 and cathodes 108. The anode contact pads of adjacent fuel cell assemblies 102 in the package 114 may be connected to one another in series, as may the cathode contact pads. The actual connection scheme will, however, depend on the power requirements of the load.

It should be noted here that the present fuel cell systems include those in which the fuel supply 128 and/or oxidant supply 130 is replenishable (or replaceable) as well as those in which all of the fuel and/or oxidant that will be consumed is initially present in the fuel supply. Additionally, the package 114, fuel supply 128 and oxidant supply 130 may be located within a common housing if desired. Such a housing would preferably have positive and negative contacts for connection to the device that is being powered by the fuel cell system.

In the exemplary embodiment illustrated in FIGS. 1–3, the anode 106 is formed from a highly selective electrocatalytic material. A "highly selective" electrocatalytic material for the anode 106 is a material that will preferably cause the fuel to be fully oxidized at the anode (or at least 80% oxidized) with no oxidant reduction (or no more than about 20% oxidant reduction if the anode is not perfectly selective). It is important that the fuel reacts at the anode 106 with little or no reduction of the oxidant, i.e. that there be little or no mixed gas reaction, because such oxidant reduction reduces the efficiency of the fuel cell. Given the fact that all or most of the fuel will be depleted before the fuel/oxidant mixture reaches the cathode 108, the oxidant will be the only portion of (or the vast majority of) the fuel/oxidant mixture to reach the cathode. The remaining volume of the gas reaching the cathode 108 will be byproducts from the reaction at the anode 106. As such, a mixed gas reaction at the cathode 108 (i.e. direct oxidation of the fuel), which reduces the efficiency of the fuel cell, is prevented regardless of the selectivity of the material used to form the cathode. The cathode 108 may, therefore, be formed from a non-highly selective electrocatalytic material. A "non-highly selective" electrocatalytic material is a material that will react with either fuel or oxidant.

Figure 4:
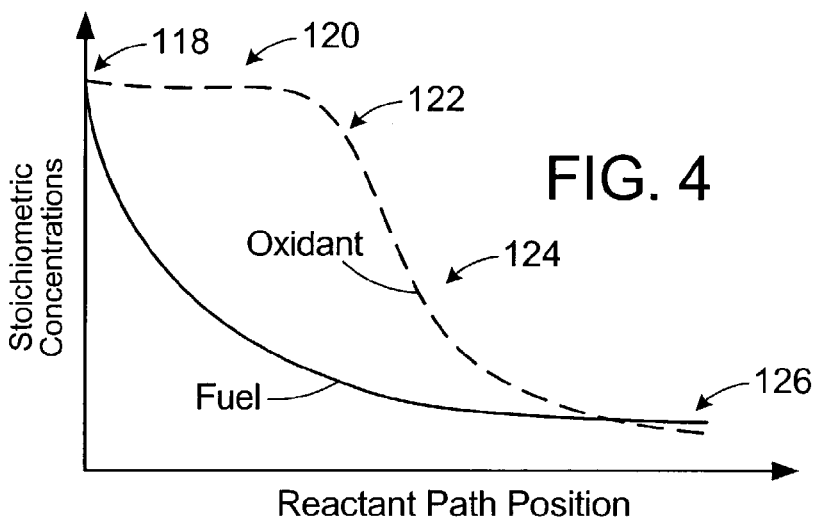
FIG. 4 is a graph showing the relative stoichiometric concentrations of fuel and oxidant at various positions within the fuel cell assembly illustrated in FIG. 3.

The serial depletion of the reactants in the fuel/oxidant mixture, e.g. the depletion of the one of the reactants in the fuel/oxidant mixture at one of the electrodes followed by the depletion of the remaining reactant at the other electrode, is graphically represented in FIG. 4. When the fuel/oxidant mixture enters the reactant channel 116 at the inlet 118, the respective stoichiometric concentrations of the fuel and oxidant will be at their initial, maximum levels. Although the initial levels are illustrated as being equal, the initial levels may vary to suit particular applications and fuels. The stoichiometric concentration of fuel in the fuel/oxidant mixture decreases, and the stoichiometric concentration of oxidant remains essentially the same, as the mixture moves through the anode region 120 and the fuel is oxidized at the anode 106. The fuel depleted reactant mixture then passes the intermediate region 122 and enters the cathode region 124, and the oxidant is reduced at the cathode 108. The exhaust (e.g. byproducts and any unused portions of the fuel/oxidant mixture) exits the reactant channel 116 by way of the outlet 126. Although the final levels of the fuel and oxidant are illustrated as being greater than zero, it should be noted that it may be desirable in many instances to configure the fuel cell and select a fuel/oxidant mixture that will result in little to no unused fuel and oxidant.

There are a number of advantages associated with the serial depletion of the reactants in the fuel/oxidant mixture. For example, and as discussed above, the depletion of essentially all of the fuel at the anode, or at least enough of the fuel to prevent any substantial reaction at the cathode, facilitates the use of non-highly selective electrocatalytic material for the cathode. The use of non-highly selective electrocatalytic material reduces the cost of the fuel cell. The use of non-highly selective electrocatalytic material also facilitates the use of electrocatalytic materials which more closely match the thermal expansion coefficient of the other components of the fuel cell, as well as electrocatalytic materials that are more active than the highly selective electrocatalytic materials.

Although the materials, dimensions, and configuration of the exemplary fuel cells 104 and substrate 112 will depend upon the type of fuel cell (e.g. SOFC, PEM, etc.) and intended application, and although the present inventions are not limited to any particular materials, dimensions, configuration or type, an exemplary fuel cell assembly 102 including SOFCs 104 is described below. The highly selective anodes 106 are preferably formed from porous, ceramic and metal composites (also referred to as "cermet") and are about 0.5 $\mu$m to about 1000 $\mu$m thick (typically about 10 $\mu$m to about 250 $\mu$m thick). Suitable ceramics include samaria-doped ceria ("SDC"), gandolinia-doped ceria ("GDC") and yttria stabilized zirconia ("YSZ") and suitable metals include nickel, copper and palladium. The non-highly selective cathodes 108 are preferably formed from cermets that are about 0.5 $\mu$m to about 1000 $\mu$m thick (typically about 10 $\mu$m to about 50 $\mu$m thick). Suitable ceramics includes SDC, samarium strontium cobaltite ("SSCO"), lanthanum strontium manganite ("LSM") and suitable metals include platinum, platinum-ruthenium, and platinum-rhodium. The electrolytes 110 are preferably a dense ceramic such as SDC, GDC, YSZ or lanthanum strontium gallium magnesium ("LSGM") and is about 2 $\mu$m to about 1000 $\mu$m thick (typically about 5 $\mu$m to about 50 $\mu$m thick). The surface area of the anodes 106, cathodes 108 and electrolytes 110, when viewed in plan, will typically be between about 0.001 cm$^2$ to about 10,000 cm$^2$ (typically about 2.5–250 cm$^2$).

The present inventions are not limited to the exemplary implementations described above. As illustrated for example in FIG. 5, the relative positions of the anodes and cathodes in the fuel cell assemblies may be reversed. The exemplary fuel cell assembly 102' and fuel cell 104' are substantially similar to the fuel cell assembly 102 and fuel cell 104 illustrated in FIG. 3 and similar elements are represented by similar reference numerals. Here, however, the cathode 108' is associated with the reactant channel inlet 118 and the anode 106' is associated with the reactant channel outlet 126. The positions of the reactant channel anode region 120 and cathode region 124 are similarly reversed. The fuel/oxidant mixture will, accordingly, pass over the cathode 108' prior to reaching the anode 106'.

Figure 5:
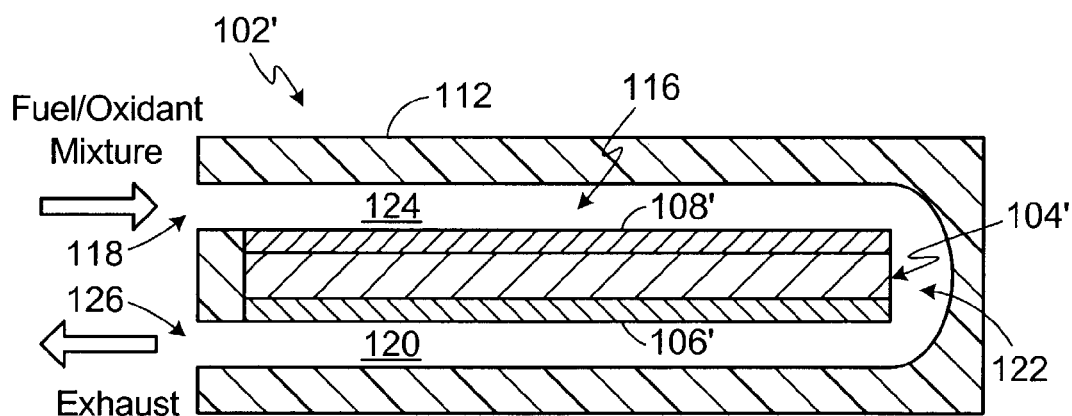
FIG. 5 is a section view of a fuel cell assembly in accordance with a preferred embodiment of a present invention.

In the exemplary implementation illustrated in FIG. 5, the cathode 108' is formed from a highly selective electrocatalytic material. A "highly selective" electrocatalytic material for the cathode 108' is a material that will cause the oxidant to be fully reduced at the cathode (or at least 80% reduced) with no oxidation of the fuel at the cathode (or no more than about 20% fuel oxidation if the cathode is not perfectly selective). It is important that oxidant reacts at the cathode 108' with little or no fuel oxidation, i.e. that there be little or no mixed gas reaction, because such oxidation reduces the efficiency of the fuel cell. Given the fact that all (or almost all) of the oxidant will be depleted before the fuel/oxidant mixture reaches the anode 106', the fuel will be only portion of (or at least the vast majority of) the fuel/oxidant mixture to reach the anode. As such, an efficiency reducing mixed gas reaction at the anode 106' is prevented regardless of the selectivity of the material used to form the anode. The anode 106' may, therefore, be formed from a non-highly selective electrocatalytic material.

The non-highly selective electrocatalytic material for the anode 106' in the exemplary fuel cell assembly 102' is preferably a cermet that is about 0.5 $\mu$m to about 1000 $\mu$m thick (typically about 10 $\mu$m to about 250 $\mu$m thick). Suitable ceramics include SDC, GDC and YSZ and suitable metals include platinum, platinum-nickel, and platinum-palladium. The exemplary highly selective cathode 108' is preferably a porous ceramic that is about 2 $\mu$m to about 1000 $\mu$m thick (typically about 20 $\mu$m thick). Suitable highly selective electrocatalytic ceramic materials include SSCO and LSM. Cermets including SDC, GDC or YSZ combined with rhodium or ruthenium may also be used. The materials electrolyte 110 are preferably the same as those discussed above, i.e. a dense ceramic such as SDC, GDC, YSZ or LSGM that is about 2 $\mu$m to about 1000 $\mu$m thick (typically about 5 $\mu$m to about 50 $\mu$m thick).

Figure 6:
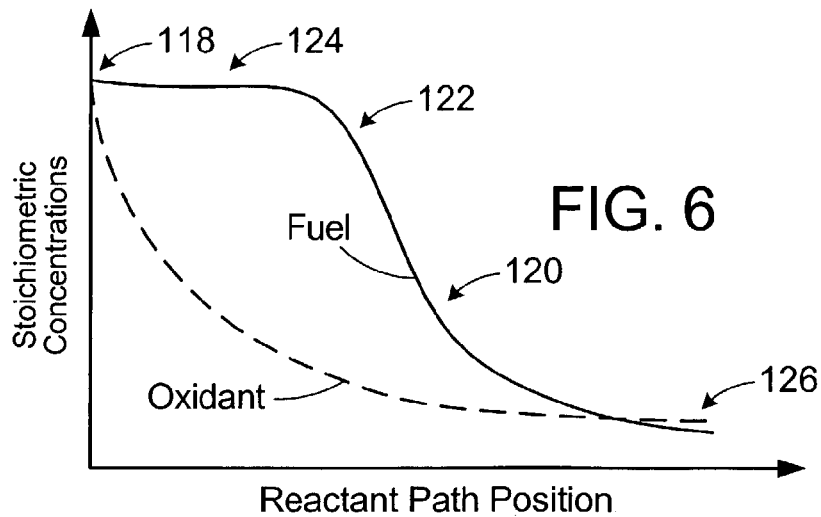
FIG. 6 is a graph showing the relative stoichiometric concentrations of fuel and oxidant at various positions within the fuel cell assembly illustrated in FIG. 5.

The serial depletion of the reactants in the fuel/oxidant mixture in the exemplary embodiment illustrated in FIG. 5 is graphically represented in FIG. 6. When the fuel/oxidant mixture enters the reactant channel at the inlet 118, the respective stoichiometric concentrations of the fuel and oxidant will be at their initial, maximum levels. Although the initial levels are illustrated as being equal, the initial levels may vary to suit particular applications and fuels. The stoichiometric concentration of oxidant in the fuel/oxidant mixture decreases, and the stoichiometric concentration of fuel remains essentially the same, as the mixture moves through the cathode region 124 and the oxidant is reduced at the cathode 108'. The oxidant depleted reactant mixture then passes the intermediate region 122 and enters the anode region 120, where the fuel is oxidized at the anode 106'. The exhaust (e.g. byproducts and any unused portions of the fuel/oxidant mixture) exits the reactant channel 116 by way of the outlet 126. Although the final levels of the fuel and oxidant are illustrated as being greater than zero, it should be noted that it may be desirable in many instances to configure the fuel cell and select a fuel/oxidant mixture that will result in little to no unused fuel and oxidant.

The exemplary fuel cell assemblies 102' illustrated in FIG. 5 may be incorporated into the system 100 illustrated in FIG. 1 in place of the fuel cell assemblies 102. Alternatively, the system 100 may be provided with an alternating plurality of fuel cell assemblies 102 and 102'.

Figure 7:
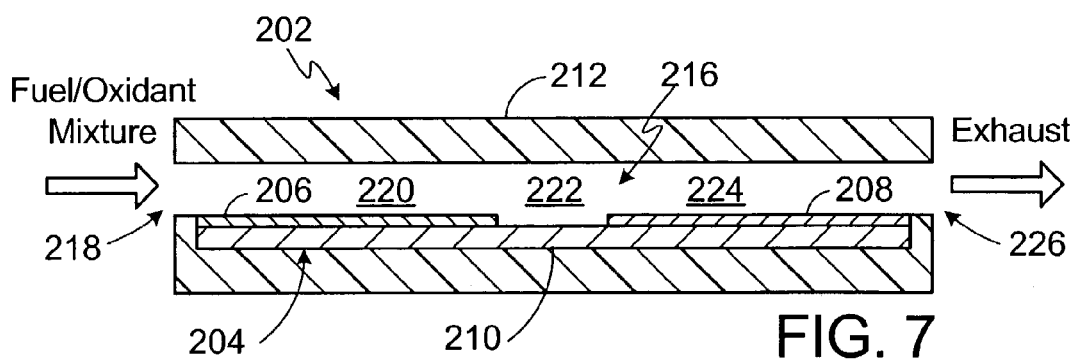
FIG. 7 is a section view of a fuel cell assembly in accordance with a preferred embodiment of a present invention.

Another exemplary fuel cell assembly is generally represented by reference numeral 202 in FIG. 7. The exemplary fuel cell assembly 202 includes a fuel cell 204, with an anode 206, cathode 208 and electrolyte 210, and a housing 212. Unlike the exemplary fuel cell 104, the anode 206 and cathode 208 are on the same side of the electrolyte 210 in the fuel cell 204. The housing 212 is provided with a reactant channel 216 that directs a fuel/oxidant mixture over the anode 206 and cathode 208. The fuel/oxidant mixture enters the reactant channel inlet 218 and then passes through an anode region 220, intermediate region 222, and cathode region 224. The exhaust (e.g. byproducts and any unused reactants) exits the fuel cell assembly by way of a reactant channel outlet 226. The inlet and outlet 218 and 226 may be connected to the manifolds of a package, such as a package similar to the package 114 illustrated in FIG. 1. The fuel cell housing 212 is preferably closed but for the reactant channel inlets and outlets 218 and 226 and the sole source of reactants is the inlet. It should also be noted that one or more housings 212 may be an integral portion of the package or, alternatively, one or more housings may be separate structural elements that are incorporated into the package during assembly.

In the exemplary embodiment illustrated in FIG. 7, the anode 206 is positioned adjacent to the reactant channel inlet 218 and is formed from a highly selective electrocatalytic material, while the cathode 208 is formed from a non-highly selective electrocatalytic material. Such materials are discussed above in greater detail with reference to FIGS. 1–4. The exemplary fuel cell assembly 202 will serially deplete the reactants in a fuel/oxidant mixture in manner described above with reference to FIGS. 1–4.

Figure 8:
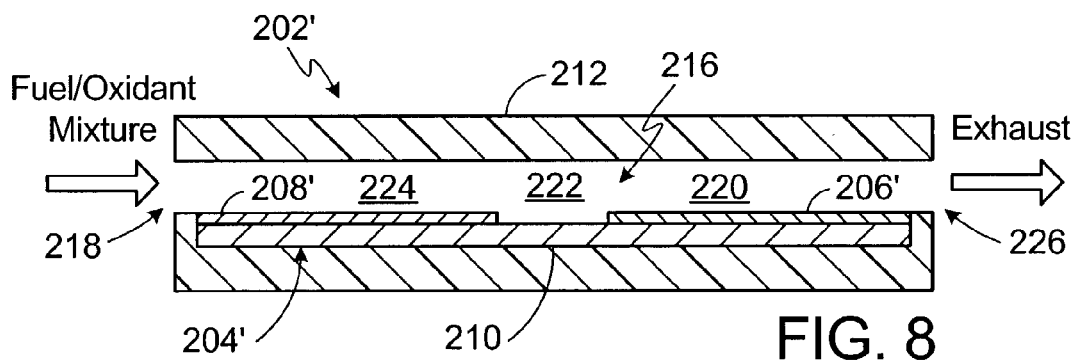
FIG. 8 is a section view of a fuel cell assembly in accordance with a preferred embodiment of a present invention.

Tuning to FIG. 8, the relative positions of the anodes and cathodes in the fuel cell assembly 202 may be reversed. The exemplary fuel cell assembly 202' and fuel cell 204' are substantially similar to the fuel cell assembly 202 and fuel cell 204 illustrated in FIG. 7 and similar elements are represented by similar reference numerals. Here, however, the cathode 208' is associated with the reactant channel inlet 218 and the anode 206' is associated with the reactant channel outlet 226. The positions of the reactant channel anode region 220 and cathode region 224 are similarly reversed. The fuel/oxidant mixture will, accordingly, reach the cathode 208' prior to reaching the anode 206'. The anode 206' is formed from a non-highly selective electrocatalytic material, while the cathode 208' is formed from a highly selective electrocatalytic material. Such materials are discussed above in greater detail with reference to FIGS. 5 and 6. The exemplary fuel cell assembly 202' will serially deplete the reactants in a fuel/oxidant mixture in manner described above with reference to FIGS. 5 and 6.

The exemplary fuel cell assemblies 202 and 202' illustrated in FIGS. 7 and 8 may be incorporated into the system 100 illustrated in FIG. 1 in place of the fuel cell assemblies 102. Alternatively, the system 100 may be provided with an alternating plurality of fuel cell assemblies 202 and 202'.

Figure 9:
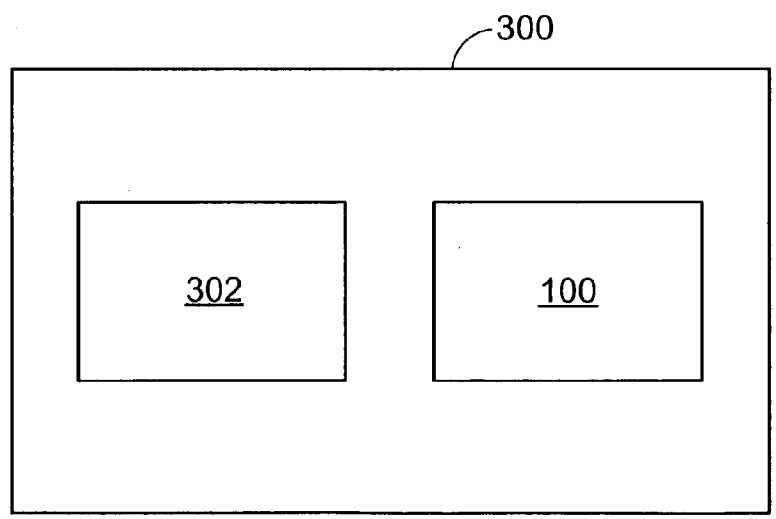
FIG. 9 is a block diagram showing an apparatus in accordance with a preferred embodiment of a present invention.

The exemplary fuel cell system 100, which may include fuel cell assemblies 102, 102', 202 and 202' or combinations thereof, may be incorporated into a wide variety of power consuming apparatus. Examples of power consuming apparatus include, but are not limited to, information processing devices such as notebook personal computers ("PCs"), handheld PCs, palmtop PCs and personal digital assistants ("PDAs"), communication devices such as mobile telephones, wireless e-mail appliances and electronic books, video games and other toys, and audio and video devices such as compact disk players and video cameras. Other electronic devices include portable test systems, portable projectors, and portable televisions such as portable flat panel televisions. Referring to FIG. 9, an exemplary apparatus 300 includes a fuel cell system 100 and a power consuming device 302 that is powered by the fuel cell system 100. The exemplary power consuming device refers to any or all devices within the particular apparatus than consume electrical power.

Although the present inventions have been described in terms of the preferred embodiments above, numerous modifications and/or additions to the above-described preferred embodiments would be readily apparent to one skilled in the art. It is intended that the scope of the present inventions extend to all such modifications and/or additions.

We claim:

1. A fuel cell, comprising:
   an electrolyte defining first and second surfaces;
   an anode associated with the first surface; and
   a cathode associated with the first surface;
   one of the anode and cathode being formed from a highly selective electrocatalytic material and the other of the anode and cathode being formed from a non-highly selective electrocatalytic material.

2. A fuel cell as claimed in claim 1, wherein the anode comprises a ceramic and metal composite that includes at least one of SDC, GDC and YSZ and at least one of nickel, copper and palladium, and the cathode comprises a ceramic and metal composite that includes at least one SDC, SSCO and LSM and at least one of platinum, platinum-ruthenium and platinum-rhodium.

3. A fuel cell as claimed in claim 1, wherein the anode comprises a ceramic and metal composite that includes at least one of SDC, GDC and YSZ and at least one of platinum, platinum-nickel and platinum-palladium and the cathode comprises at least one of SSCO, LSM and a ceramic and metal composite including at least one of SDC, GDC and YSZ and at least one of rhodium and ruthenium.

4. A fuel cell assembly, comprising:
a housing including a reactant channel defining an inlet and an outlet, the reactant channel being closed but for the inlet and the outlet; and
a fuel cell, positioned within the housing such that the reactant channel is not substantially occupied by the fuel cell, including an anode that is exposed to the reactant channel between the inlet and the outlet, a cathode that is exposed to the reactant channel between the inlet and the outlet, and an electrolyte associated with the anode and cathode, the anode being closer to one of the inlet and the outlet, and the cathode being closer to the other of the inlet and the outlet.

5. A fuel cell assembly, comprising:
a housing including a reactant channel defining a U-like shape, an inlet and an outlet, the reactant channel being closed but for the inlet and the outlet; and
a fuel cell, positioned within the housing, including an anode that is exposed to the reactant channel between the inlet and the outlet, a cathode that is exposed to the reactant channel between the inlet and the outlet, and an electrolyte associated with the anode and cathode defining first and second surfaces, the anode being closer to one of the inlet and the outlet and associated with the first surface, and the cathode being closer to the other of the inlet and the outlet and associated with the second surface.

6. A fuel cell assembly comprising:
a housing including a reactant channel defining an inlet and an outlet, the reactant channel being closed but for the inlet and the outlet and substantially linear from the inlet to the outlet; and
a fuel cell, positioned within the housing, including an anode that is exposed to the reactant channel between the inlet and the outlet, a cathode that is exposed to the reactant channel between the inlet and the outlet, and an electrolyte associated with the anode and cathode defining defines first and second surfaces, the anode being closer to one of the inlet and the outlet and associated with the first surface, and the cathode being closer to the other of the inlet and the outlet and associated with the first surface.

7. A fuel cell assembly, comprising:
a housing including a reactant channel defining an inlet and an outlet, the reactant channel being closed but for the inlet and the outlet; and
a fuel cell, positioned within the housing, including an anode that is exposed to the reactant channel between the inlet and the outlet, a cathode that is exposed to the reactant channel between the inlet and the outlet, and an electrolyte associated with the anode and cathode, the anode being closer to one of the inlet and the outlet, and the cathode being closer to the other of the inlet and the outlet;
wherein one of the anode and the cathode is formed from a highly selective electrocatalytic material and the other of the anode and the cathode is formed from a non-highly selective electrocatalytic material.

8. A fuel cell assembly as claimed in claim 7, wherein the anode comprises a ceramic and metal composite that includes at least one of SDC, GDC and YSZ and at least one of nickel, copper and palladium, and the cathode comprises a ceramic and metal composite that includes at least one SDC, SSCO and LSM and at least one of platinum, platinum-ruthenium and platinum-rhodium.

9. A fuel cell assembly as claimed in claim 7, wherein the anode comprises a ceramic and metal composite that includes at least one of SDC, GDC and YSZ and at least one of platinum, platinum-nickel and platinum-palladium and the cathode comprises at least one of SSCO, LSM and a ceramic and metal composite including at least one of SDC, GDC and YSZ and at least one of rhodium and ruthenium.

10. A fuel cell assembly, comprising:
a fuel cell including an anode defining an interior surface and an exterior surface, a cathode and an electrolyte associated with the interior surfaces of the anode and cathode; and
means for directing a fuel/oxidant mixture along the exterior surface of one of the anode and the cathode, whereby a portion of the fuel/oxidant mixture is depleted and a portion remains, and directing only the portion of the fuel/oxidant mixture that remains along the exterior surface of the other of the anode and the cathode.

11. A fuel cell assembly as claimed in claim 10, wherein the electrolyte defines first and second surfaces, the anode is associated with the first surface, and the cathode is associated with the second surface.

12. A fuel cell assembly, comprising:
a fuel cell including an electrolyte defining first and second surfaces, an anode associated with the first surface, and a cathode associated with the first surface; and
means for directing a fuel/oxidant mixture over one of the anode and the cathode, whereby a portion of the fuel/oxidant mixture is depleted and a portion remains, and directing only the portion of the fuel/oxidant mixture that remains over the other of the anode and the cathode.

13. A fuel cell assembly, comprising:
a fuel cell including an anode, a cathode and an electrolyte associated with the anode and cathode, one of the anode and the cathode being formed from a highly selective electrocatalytic material and the other of the anode and the cathode being formed from a non-highly selective electrocatalytic material; and
means for directing a fuel/oxidant mixture over one of the anode and the cathode, whereby a portion of the fuel/oxidant mixture is depleted and a portion remains, and directing only the portion of the fuel/oxidant mixture that remains over the other of the anode and the cathode.

14. A fuel cell assembly as claimed in claim 13, wherein the anode comprises a ceramic and metal composite that includes at least one of SDC, GDC and YSZ and at least one of nickel, copper and palladium, and the cathode comprises a ceramic and metal composite that includes at least one SDC, SSCO and LSM and at least one of platinum, platinum-ruthenium and platinum-rhodium.

15. A fuel cell assembly as claimed in claim 13, wherein the anode comprises a ceramic and metal composite that includes at least one of SDC, GDC and YSZ and at least one of platinum, platinum-nickel and platinum-palladium and the cathode comprises at least one of SSCO, LSM and a ceramic and metal composite including at least one of SDC, GDC and YSZ and at least one of rhodium and ruthenium.

16. A fuel cell system, comprising:
a fuel source;
an oxidant source;
a fuel cell including an anode, a cathode and an electrolyte associated with the anode and cathode, one of the anode and cathode being formed from a highly selective electrocatalytic material and the other of the anode and cathode being formed from a non-highly selective electrocatalytic material; and
a package that is configured to combine fuel from the fuel source and oxidant from the oxidant source, thereby producing a fuel/oxidant mixture, and to supply the fuel/oxidant mixture to the fuel cell.

17. A fuel cell system as claimed in claim 16, wherein the electrolyte defines first and second surfaces, the anode is associated with the first surface, and the cathode is associated with the second surface.

18. A fuel cell system, comprising:
a fuel source; and
a fuel cell including an electrolyte defining first and second surfaces, an anode and a cathode, one of the anode and cathode being formed from a highly selective electrocatalytic material and associated with the first surface, and the other of the anode and cathode being formed from a non-highly selective electrocatalytic material and associated with the first surface.

19. A method of operating a fuel cell including an anode and a cathode, the method comprising the steps of:
supplying a fuel/oxidant mixture to one of the anode and the cathode without supplying the fuel/oxidant mixture to the other of the anode and the cathode;
depleting one of the fuel and the oxidant at the one of the anode and the cathode with a highly selective catalytic material without substantially depleting the other of the fuel and oxidant, thereby creating a partially depleted fuel/oxidant mixture;
supplying only the depleted fuel/oxidant mixture to the other of the anode and the cathode; and
depleting the other of the fuel and the oxidant at the other of the anode and the cathode with a non-highly selective catalytic material.

20. A method as claimed in claim 19, wherein the step of supplying a fuel/oxidant mixture to one of the anode and the cathode comprises supplying a fuel/oxidant mixture to the anode without supplying the fuel/oxidant mixture to the cathode.

21. A method as claimed in claim 19, wherein the step of supplying a fuel/oxidant mixture to one of the anode and the cathode comprises supplying a fuel/oxidant mixture to the cathode without supplying the fuel/oxidant mixture to the anode.

22. A method of operating a fuel cell including an anode and a cathode, the method comprising the steps of:
supplying a fuel/oxidant mixture to the anode without supplying the fuel/oxidant mixture to the cathode;
depleting at least 80% of the fuel and less than 20% of the oxidant at the anode, thereby creating a partially depleted fuel/oxidant mixture;
supplying only the partially depleted fuel/oxidant mixture to the cathode; and
depleting the oxidant at the cathode.

23. A method of operating a fuel cell including an anode and a cathode, the method comprising the steps of:
supplying a fuel/oxidant mixture to the cathode without supplying the fuel/oxidant mixture to the anode;
depleting at least 80% of the oxidant and less than 20% of the fuel at the cathode, thereby creating a partially depleted fuel/oxidant mixture;
supplying only the partially depleted fuel/oxidant mixture to the anode; and
depleting the fuel at the anode.

24. A method of operating a fuel cell, comprising the steps of:
supplying a fuel/oxidant mixture to the fuel cell; and
generating electricity by serially depleting the fuel and the oxidant with a highly selective catalytic material and a non-highly selective catalytic material.

25. A method as claimed in claim 24, wherein the step of generating electricity by serially depleting the fuel and the oxidant comprises:
depleting the fuel in the fuel/oxidant mixture without substantially depleting the oxidant; and
depleting the oxidant after the step of depleting the fuel in the fuel/oxidant mixture.

26. A method as claimed in claim 24, wherein the step of generating electricity by serially depleting the fuel and the oxidant comprises:
depleting the oxidant in the fuel/oxidant mixture without substantially depleting the fuel; and
depleting the fuel after the step of depleting the oxidant in the fuel/oxidant mixture.

27. A method of operating a fuel cell, comprising the steps of:
supplying a fuel/oxidant mixture to the fuel cell; and
generating electricity by
depleting at least 80% the fuel in the fuel/oxidant mixture without substantially depleting more than 20% of the oxidant and
depleting the oxidant after the step of depleting the fuel in the fuel/oxidant mixture.

28. A method of operating a fuel cell, comprising the steps of:
supplying a fuel/oxidant mixture to the fuel cell; and
generating electricity by
depleting at least 80% the oxidant in the fuel/oxidant mixture without substantially depleting more than 20% of the fuel, and
depleting the fuel after the step of depleting the oxidant in the fuel/oxidant mixture.

29. A fuel cell assembly, comprising:
a housing including a substantially unobstructed reactant channel defining an inlet and an outlet; and
means for generating electricity by serially depleting a fuel/oxidant mixture having initial fuel and oxidant concentrations that is supplied to the inlet of the housing such that one of the fuel concentration and the oxidant concentration is reduced prior to the other of the fuel concentration and the oxidant concentration.

30. A fuel cell assembly as claimed in claim 29, wherein the reactant channel is substantially linear from the inlet to the outlet.

31. A fuel cell assembly, comprising:
a housing including a substantially U-shaped reactant channel defining an inlet and an outlet; and
means for generating electricity by serially depleting a fuel/oxidant mixture that is supplied to the inlet of the housing.

* * * * *